Nov. 14, 1961     S. T. MARTIN     3,008,326
APPARATUS FOR MEASURING VISCOSITY

Filed March 27, 1958     3 Sheets-Sheet 1

INVENTOR.
STERLING T. MARTIN
BY
ATTORNEY

Nov. 14, 1961  S. T. MARTIN  3,008,326
APPARATUS FOR MEASURING VISCOSITY
Filed March 27, 1958  3 Sheets-Sheet 2

INVENTOR.
STERLING T. MARTIN
BY
ATTORNEY

Nov. 14, 1961 S. T. MARTIN 3,008,326
APPARATUS FOR MEASURING VISCOSITY
Filed March 27, 1958 3 Sheets-Sheet 3

INVENTOR.
STERLING T. MARTIN
BY Howard K. Kothe
ATTORNEY

United States Patent Office 3,008,326
Patented Nov. 14, 1961

3,008,326
APPARATUS FOR MEASURING VISCOSITY
Sterling T. Martin, Charleston, W. Va., assignor to Union Carbide Corporation, a corporation of New York
Filed Mar. 27, 1958, Ser. No. 724,360
9 Claims. (Cl. 73—60)

This invention relates to a novel viscometer. More particularly, it relates to a viscometer which reads under conditions of constant stress and variable shear rate, or constant shear rate and variable stress.

The great increase in the commercial production of plastic resins in recent years has created a great need for apparatus for monitoring the processes in which the resins are produced. One of the more pressing problems faced by the manufacturers of these resins has been the need for a viscometer which could give a reasonably accurate indication of the viscosity of the resins during the preparation of a final product.

The greatest difficulties presented by the plastics industries are due to the fact that the viscosities to be measured often run in the neighborhood of one hundred thousand poise units and that the measurement must be taken at elevated temperatures often well above 100° C.

A further need of the industry is that these viscosity measurements be taken continuously and rapidly during the production cycle if accurate control of the process is to be obtained. Another requirement is that such a viscometer be placed directly in series with the process flow path so that accurate samplings can be taken. Also, the design must ideally be such that variations of flow rate through the process do not materially affect the readings of the viscometer.

The production of polyethylene is a typical example of an industrial process wherein adequate instrumentation means for measuring viscosities is badly needed. During the pyrolysis of polyethylene to a final commercial product, it has been found that the degree of pyrolysis is directly related to the viscosity of the resin at the particular point in the pyrolytic process. This viscosity has been called the melt index viscosity. Although the melt index viscosity is not a viscosity in the true sense of the word, since it is taken at an elevated temperature rather than a normal temperature at which a substance is to be used, it has, nevertheless, been found to be the best indication available of the amount of pyrolysis that has occurred in the polyethylene production cycle. However, in measuring the melt index viscosity of polyethylene during a production cycle, temperatures of up to several hundred degrees centigrade are encountered as well as extremely high viscosities. Consequently, an instrument capable of meeting these rigorous conditions had to be developed.

It has further been found that for measuring the viscosity of certain plastics a more accurate indication of the true viscosity is obtained when the shear rate is maintained constant and the viscosity is taken as a function of varying shear stress. While in other plastics, a more accurate indication of viscosity is obtained when the shear stress is maintained at a constant level and the viscosity is taken as a function of varying shear rate. Stated briefly, the shear rate is the speed at which the plastic material flows across the surface of the member measuring the torque. The shear stress is the drag, or force exerted on the torque measuring member as the plastic material passes thereover. It is to be understood that these terms apply to a rotary type of viscometer.

Presently available commercial viscometers are not able to fulfill the requirements of the plastics industry. These viscometers fall generally into two classes: (1) a static type wherein the fluid whose viscosity is to be measured flows through a calibrated orifice under a set of standard conditions, and (2) the rotary type wherein the viscometer is immersed in the fluid whose viscosity is to be measured. The basic components of said rotational viscometer are two concentrically arranged cylindrical members which are spaced radially relative to one another to form an annulus for receiving the fluid to be tested and one of which is rotatable relative to the other. In operation, the rotatable member is rotated and any one of several conditions is measured which is proportional to the viscous forces set up in the fluid by the rotation of the one member relative to the other and which, together with other known quantities, can be correlated to determine the viscosity of the fluid. The condition usually measured to determine viscosity is the rotational stress, or torque, transmitted from the inner rotating member to the outer member through the viscous fluid being tested. All of the prior art viscometers have been limited strictly to viscosity measurements in the general range of hundreds of centipoises. As stated previously this is far below the range of viscosities encountered in the plastics manufacturing industry where many of the resins are only semiplastic even at elevated temperatures.

It is accordingly an object of this invention to provide a viscometer for use in the plastic manufacturing industry capable of measuring the high viscosities encountered in the production of various thermoplastic resins.

It is a further object to provide such an instrument capable of giving an indication of viscosity at constant shear rate, and variable shear stress, or variable shear rate and constant shear stress.

Another object is to provide such a device capable of obtaining a good sampling of an entire production stream and at the same time be independent of the rate of stream flow.

Other objects and advantages will be apparent from a detailed description of the apparatus in conjunction with the drawings in which.

According to this invention, a viscometer is provided comprising a body portion having a longitudinal passageway therein, a cylindrical chamber, whose axis is displaced from and at a right angle to the axis of said passageway in said body, and which opens into said passageway along the periphery thereof, a cylinder rotatably mounted in said chamber having an axis parallel to the axis of said chamber and a diameter less than a length substantially equal to that of said chamber whereby an annulus is formed between the cylinder and the walls of the chamber, a torque responsive member located in an opening in the periphery of the cylindrical chamber diametrically opposite from the passageway, and means for developing a signal proportional to the torque exerted on the torque sensitive member.

Figure 1:
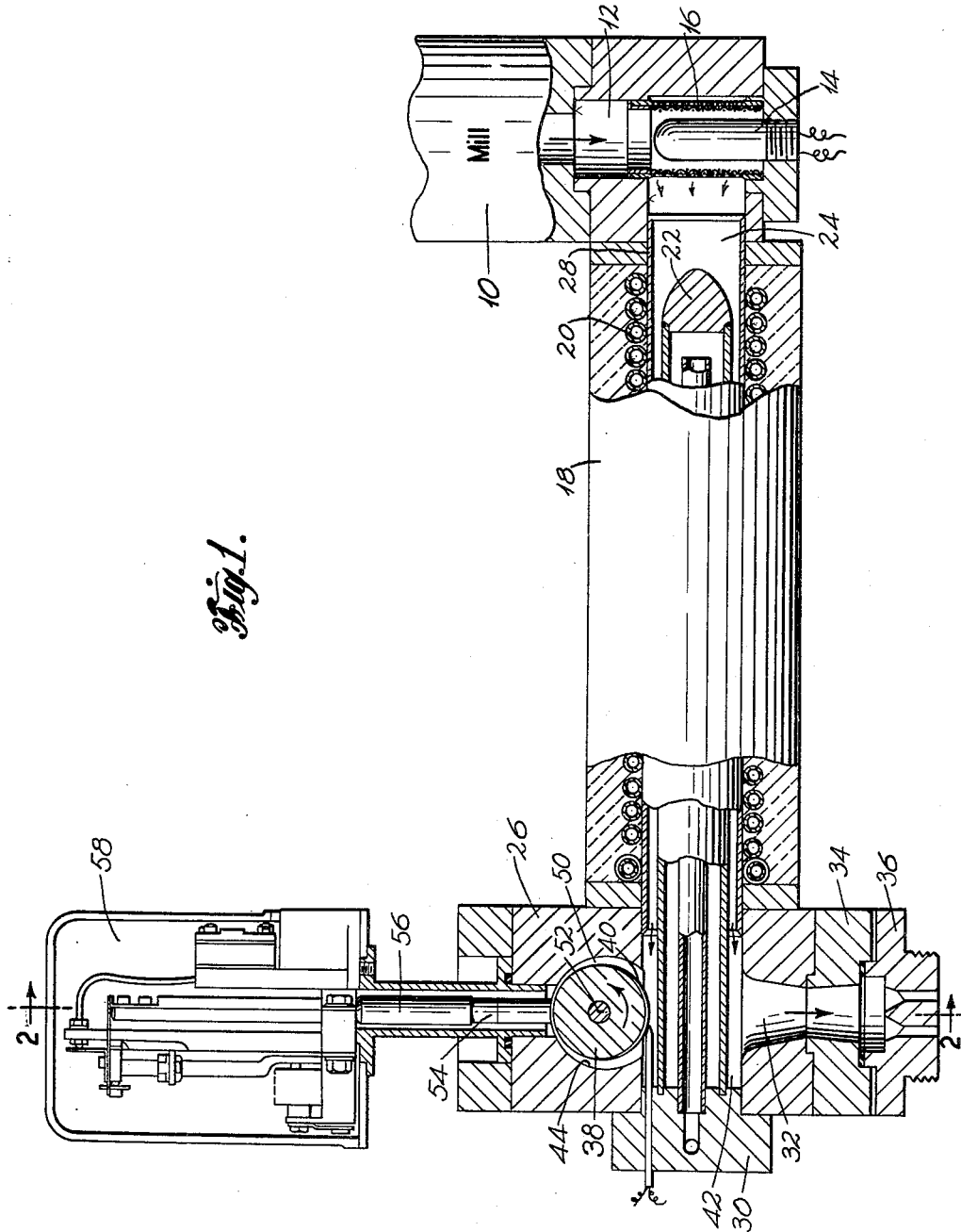
FIGURE 1 is a longitudinal cross-section view of a viscometer embodying the invention.
Figure 2:
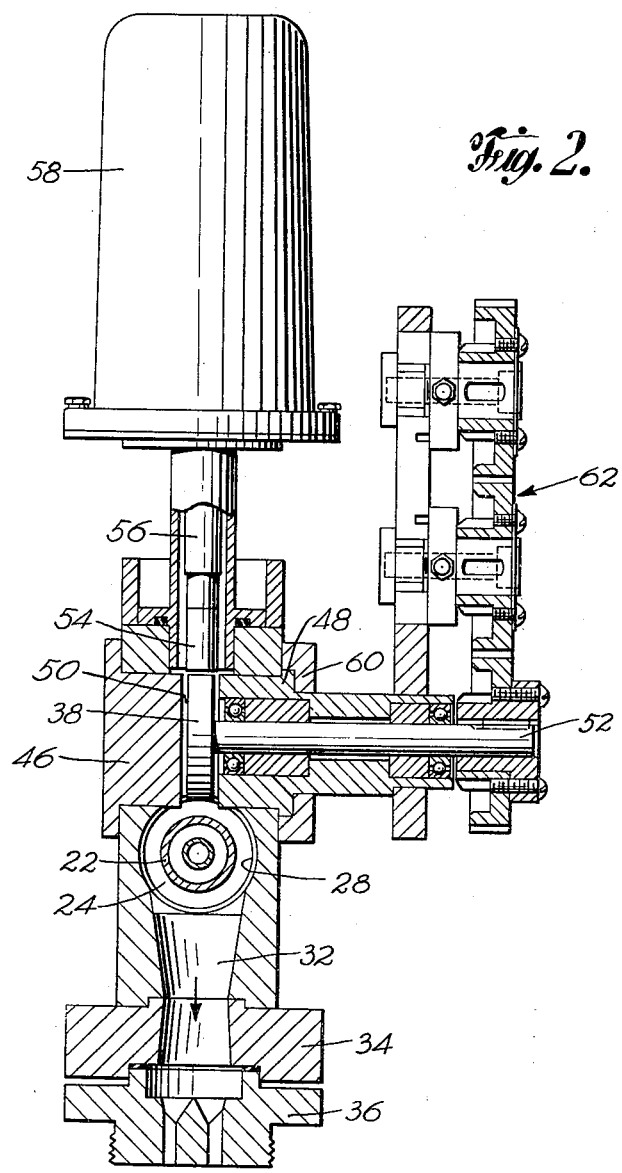
FIGURE 2 is a transverse cross-section of the viscometer taken along line 2—2 of FIGURE 1.

Referring specifically to FIGURES 1 and 2, there is shown a preferred embodiment of this invention in which like reference numerals refer to like components. The viscometer is shown attached to the output of a Marshall pyrolyzing mill 10; however, it is to be understood that it can be placed at any point in the flow path of a particular process being examined.

Flow from the mill first enters a chamber having a heater 14 and a screen 16 therein. The heater is merely to heat the resin in the chamber to the plastic state upon initial starting of the apparatus, and along with the filter screen 16, does not constitute a patentable portion of the viscometer.

Flow from the filter 16 enters the heat exchanger 18 where it is fed around a torpedo-like center element 22. This element is the inner thermal wall of the annular cavity 24, which extends through both the heat exchanger and the viscometer body 26. This annular space, which is equal to or greater than the mill exit port 12 in cross-section throughout its length, has as its outer surface a thermal wall 28 for the length of the heat exchanger unit. Close tolerance temperature control at a point nearest the actual measurement is the motive for this construction, and its particular cross-sectional design is intended to reduce the effect of certain flow characteristic disadvantages of some fluids by increasing the ratio of transfer surface area to fluid cross-section.

The annular configuration 24 is continued through the viscometer body 26 to dead end at a centering flange 30 of the torpedo-like insert 22. Ninety degrees to the insert 22 and on a vertical center line of the viscometer body 26 is a discharge port 32 downwardly directed through a die plate adapter 34 and an extrusion die 36. On the center line above the insert 22 and extending slightly into the annular cavity 24 is a driven cylinder 38 having a roughened surface which feeds the plastic material into the viscometer proper at a rate independent of the flow in the annular passageway 24.

It may be seen by referring to both FIGURES 1 and 2 that the main body portion of the viscometer 26 contains two major bores therein. The bore 42 defines the principal material flow path and contains the torpedo element 22. The bore 44 is located above and at right angles to the bore 42 but intersects with the bore 42, along the peripheral surfaces of the two bores. A cylindrical chamber 50 is formed in body portion 26 by closing the bore 44 at one end with member 46 and at the other end with member 48, which constitutes a bearing block for the driving means or shaft 52 for a rotating cylinder 38. As may be seen, this cylindrical chamber connects with the annular passageway 24 so that the cylinder 38 located in the cylindrical chamber extends down into said passageway. Located in the upper portion of the cylindrical cavity is a shoe member 54 which rests on the material being drawn thereunder by the rotating cylinder. A commercial sensing element 58 of the force bar type is used to measure the angular displacement of this shoe 54, attached to its lower extremity 56.

As may be seen in FIGURE 1, the diameter of the cylinder 38 is less than the diameter of the cylindrical chamber 50, and it may also be seen that the axis of the cylinder 38 is eccentric to the axis of the chamber 50. Thus, two arcuate, wedge-shaped passageways are formed within said chamber, the thin portion or portion of least cross-sectional area thereof occurring near the upper part of the chamber adjacent to the measuring shoe.

In operation, as the plastic material flows through the annular chamber 24 and out through the exit port 32, the cylinder 38 turns in a direction against the flow of the plastic material and in so doing draws plastic material up into the wedge-shaped arcuate chamber or passageway formed between itself and the cylindrical chamber and under the measuring shoe. Thus, the moving material displaces the measuring shoe a distance that is proportional to the viscosity of the material being measured. This displacement is a function of the shearing strength of the fluid or material and may be converted to an indication of the viscosity by means of the sensing element 58.

Since other more viscous materials might not be able to pass through the extremely thin cross-section between the rotating cylinder 38 and the measuring shoe 54, means is provided in the instrument for varying this distance. This is accomplished by means of the eccentric mounting of the shaft 52 in the bearing block 48. By this means, as the bearing block 48 is rotated, the distance between the cylinder 38 and the shoe may be varied as the axis of the shaft moves about the eccentric center. Automatic drive means may be attached to the block 48 by means of a torque arm attached at 60 to achieve the desired spacing. The driving means for the shaft 52 and cylinder 38 is indicated by numeral 62 and includes various gears and support means therefor for rotating the shaft. It is to be understood that the shaft may be driven by a variable speed drive for changing the speed of the rotation of the shaft in accordance with desired results.

There are thus three parameters within the viscometer which may vary: (1) the torque exerted on the torque measuring shoe 54, (2) the speed of the rotating feed cylinder 38, and (3) the spacing between the rotating feed cylinder and the force measuring shoe 54. By maintaining two of these parameters constant and observing variations in the third, viscosity measurements under various conditions may be made.

As stated previously, shear rate is the speed at which the plastic material is moving past the measuring shoe. This is dependent upon both the speed of rotation of the feed cylinder 38 and the distance between the feed cylinder and the force bar shoe 54. The reason for the latter is that, as the spacing between the cylinder and the shoe increases, peripheral speed directly under the shoe is less because layers of the liquid at a greater radius from the center of the rotating cylinder are subjected to decreasing transmitted forces due to increased slipping of the liquid, the speed of rotation being held constant.

The force measuring device shown at 56 is a force-balance type pneumatic transmitter. However, any of several force measuring devices could be used for the practice of the invention with equally good results. For a detailed description of a similar type of force measuring instrument, reference is made to co-pending U.S. application, Serial No. 641,647 of C. G. Heisig, filed February 21, 1957 now Patent No. 2,869,358. Since this device is only exemplary of a force measuring instrument that may be used in connection with a viscometer, such a detailed description will not be attempted here. In general, however, the device consists of a force measuring arm which is attached in this instance to the shoe 54. The device is essentially a proportioning valve whose pneumatic output pressure is proportional to the angular displacement of the bar or arm 56. Thus a pneumatic output signal is obtained from the sensing element which is proportional to the displacement of displacing torque exerted upon the force arm 56 through the shoe 54 by the plastic material passing thereunder. The apparatus thus disclosed is able to measure viscosities under two differing sets of conditions.

As stated previously different materials have the characteristic of rendering more representative viscosity values under different conditions, i.e., where shear stress is held constant and viscosity is measured as a function of varying shear rate; and where shear rate is held constant and viscosity is measured as a function of varying shear stress. The three variable parameters incorporated in the present device make it readily adaptable to either condition.

The first mode of operation possible with the instant device is one wherein the shear rate is maintained constant and the viscosity is measured as a function of the varying shear stress. For such operation the motor speed is maintained constant and the spacing between the cylinder 38 and the force measuring shoe 54 is maintained constant by maintaining the cylinder axis at a constant point with respect to the axis of the cavity 44. Thus the viscous drag, torque, or shear stress exerted on the shoe 54 is a function of the viscosity of the fluid passing thereunder. This torque is converted to a proportional air signal by the sensing means 58 which may then be utilized to operate a recorder or to control a step in the production process such as the temperature of a pyrolyzing mill. It is reiterated that for this mode of operation the magnitude of the shear stress or viscous drag on the force measuring member is the indication of viscosity.

The second mode of operation possible with this device is where the shear stress is maintained constant and the resultant variation of shear rate is utilized as the function of the viscosity. In this mode the torque on the force measuring member is maintained at a constant level by varying the shear rate through suitable sensing mechanisms which detect a variation from a preselected torque or shear stress on said member and vary the shear rate accordingly. As stated previously, the shear rate may be changed by varying the cylinder 38 speed or by varying the spacing between the cylinder and the shoe 54.

In the first constant shear stress mode of operation, the speed of the cylinder is changed by a conventional control circuit connected to the variable speed drive means, the spacing or eccentric mounting of the cylinder being maintained constant. The speed control means changes speed whenever a signal from the force sensing means indicates that the force or torque thereon is changing from a fixed point. Thus when the viscosity of the fluid decreases the force on the sensing member would decrease and cause a motor speed up to maintain the torque or shear stress at the predetermined constant level. In this mode the viscosity of the fluid is an inverse function of the motor speed (revolutions per minute).

In the second mode of constant shear stress, operation, the spacing between the cylinder and the force measuring member is varied, the rotary speed of the cylinder being maintained constant. The driving means which rotates the axis of the cylinder 38 around its eccentric axis is energized whenever a variation from the preselected torque on the force sensing member occurs. Thus when the torque on the sensing member increases the driving means is energized to rotate the axis of the cylinder away from sensing member so that the original preselected torque is again present for reasons stated previously. In this mode of operation the viscosity of the fluid is a direct function of the spacing between the cylinder and the force sensing member.

In the two constant shear stress modes of operation the speed of rotation and spacing between cylinder and shoe may be measured by a number of conventional devices and the resultant signal sent to a recorder or used to control a process as disclosed for the constant shear rate mode of operation.

The device thus disclosed has a flexibility heretofore unobtainable with previous viscometers. A single unit can be used to monitor plastic production wherein the particular resin has the characteristic of giving most accurate viscosity indications with (1) constant shear rate, viscosity being a function of variations in shear stress or (2) constant shear stress, viscosity being a function of variations in shear rate. The design further permits direct sampling of the entire flow stream and also constant purging of the measuring chamber by flow of new material. Of further advantage is the novel material feeding system wherein the rotating cylinder both imparts the shearing forces necessary to make such measurements and also provides the separate material sampling means whereby the readings will be independent of the full stream flow while at the same time giving a continuous measurement of product viscosity data.

The novel wedge-shaped cavity formed between the larger cylindrical measuring cavity and the smaller feed cylinder also improves performance by concentrating measured forces and improving certain flow characteristics.

As stated in detail previously the novel viscometer structure including the eccentric cylinder drive mounting means when used with a conventional variable speed drive and control means therefor and a cylinder axis eccentricity varying means allows viscosity measurements under two different sets of conditions wherein any one of three viscometer parameters is varied as a function of the viscosity, the other two being maintained constant.

The instant viscometer has been shown used with a Marshall pyrolyzing mill wherein it is used to determine melt index; however, it is to be understood that the instrument is equally adaptable for use anywhere in a plastic production cycle where there is some advantage in taking dynamic viscosity measurement. Also the torpedo-shaped heat exchanger is shown and has the stated advantages; however, this also could be dispensed with without departing from the spirit and scope of the invention. Nor should the locations of the outlet die be considered limiting since this could be equally well located in line with the longitudinal passageway.

Figure 3:
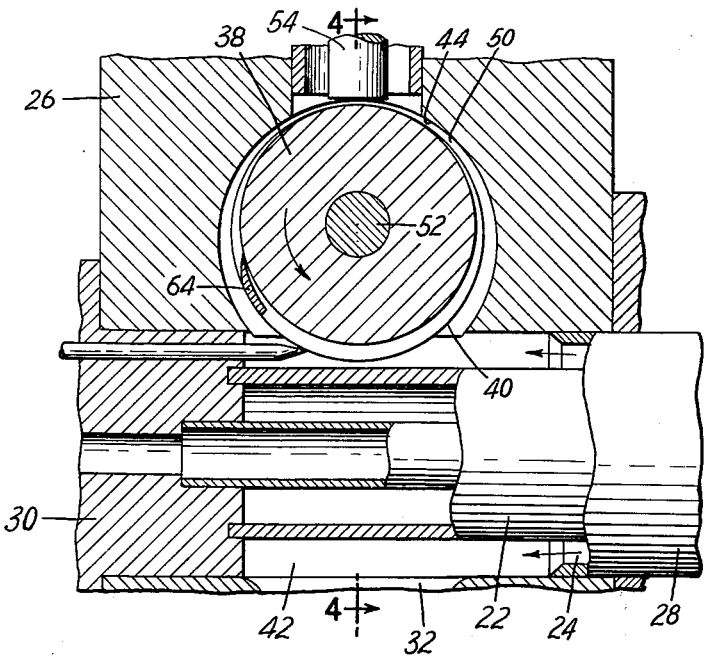
FIGURE 3 is a fragmentary cross-sectional view of the apparatus shown in FIGURE 1, enlarged to show details
Figure 4:
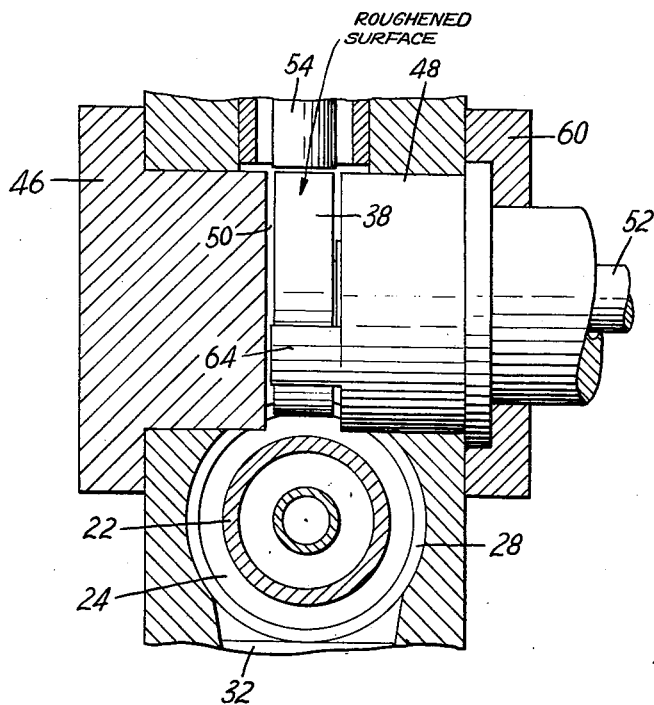
FIGURE 4 is a fragmentary cross-sectional view of the apparatus as shown in FIGURE 2, enlarged to show details.

For some applications especially for some highly viscous fluids it has been found beneficial to employ some means such as a knife edge 64 in the chamber 44, as shown in FIGURES 3 and 4 of the drawings, to help remove any material which tends to stick to the surface of cylinder 38. This knife edge is located in the annular passageway 40 downstream from the measuring shoe 54 so that material removed will enter the principal stream through the longitudinal passageway. It is also possible to use a discharge port above the shoe 54 in the tube containing the torque arm. As the device operates a small amount of material may be forced up into these areas and if allowed to remain, might set and inundate the instrument. It can thus be seen that these and many other minor modifications are possible without departing from the spirit and scope of the invention. The only limitations intended are those stated in the following claims.

What is claimed is:

1. An apparatus for measuring viscosity which comprises a body portion having passage means therein, said body portion also having a cylindrical measuring chamber positioned above and communicating with said passage means and having an axis displaced from and at a right angle to the axis of said passage means, cylinder means rotatably mounted in said chamber and having an axis parallel to the axis of said chamber and a diameter less than that of said chamber whereby an annular space is formed between said cylinder means and the walls of said chamber, drive means connection to said cylinder means, torque responsive means located in an opening in said walls of said chamber away from said passage means, and means for developing a signal proportional to the torque exerted on said torque responsive means.

2. An apparatus for measuring viscosity as set forth in claim 1, in which the axis of said rotatably mounted cylinder means is eccentrically mounted with respect to the axis of said chamber and including means for rotating the axis of said cylinder around the axis of said chamber.

3. An apparatus for measuring viscosity as set forth in claim 1, wherein the cross-sectional area of said annular space decreases and is at a minimum adjacent the torque responsive means.

4. An apparatus for measuring viscosity as set forth in claim 1, which includes heating means in said passage for maintaining the temperature of plastic material flowing therethrough at a constant controlled level.

5. An apparatus for measuring viscosity as set forth in claim 1, wherein the surface of said cylinder means is roughened to facilitate feed of material into said annular space.

6. An apparatus as set forth in claim 1 including a knife edge in scraping relationship with the surface of the rotatable cylinder downstream from the torque sensitive means in said annular space and adjacent the point of communication between the chamber and the passageway.

7. An apparatus for measuring viscosity which comprises a body portion having a longitudinal passageway therein, said body portion also having a cylindrical chamber in said body portion communicating with said passageway having an axis displaced from and at right angles to the axis of said passageway, the communication between said chamber and the passageway occurring along the peripheral surfaces thereof, a cylinder rotatably mounted in said chamber, said cylinder having a diameter less than and a length substantially equal to that of said chamber, the periphery of said cylinder projecting through the connecting opening into the passageway and the axis of rotation of said cylinder being eccentrically positioned in said chamber, drive means connected to said cylinder, a torque sensitive means projecting into the periphery of said chamber at a point away from said point of communication and means for developing a signal proportional to the torque applied to the torque sensitive means.

8. An apparatus as set forth in claim 7 wherein said drive means connected to said rotatably mounted cylinder is variable in speed and is responsive to the output signal from the torque sensitive means to vary the speed of the cylinder to maintain said output signal from the torque sensitive means constant, and means connected to said drive means for developing a signal proportional to the speed thereof.

9. An apparatus as set forth in claim 7 also containing means for rotating the axis of the rotatable drive means about its axis of eccentricity responsive to the output signal from said torque sensitive means to maintain said output signal constant, and means connected to said first named means to develop a signal indicative of its angular position.

References Cited in the file of this patent

UNITED STATES PATENTS

| | | |
|---|---|---|
| 1,960,225 | Schoenberg | May 22, 1934 |
| 2,198,325 | Wynn et al. | Apr. 23, 1940 |
| 2,869,358 | Heisig | Jan. 20, 1959 |

OTHER REFERENCES

Journal of Scientific Instruments, by C. A. R. Pearce, vol. 30, July 1953, pages 232–236.